(12) United States Patent
Li et al.

(10) Patent No.: US 11,958,127 B1
(45) Date of Patent: Apr. 16, 2024

(54) SHOULDER-ANGLE-ADJUSTABLE FRICTION STIR WELDING HEAD SUITABLE FOR FILLET JOINT

(71) Applicant: Hefei University of Technology, Hefei (CN)

(72) Inventors: Beibei Li, Hefei (CN); Pengcheng He, Hefei (CN); Jingfeng Wang, Hefei (CN); Wenqi Qi, Hefei (CN); Guoqiang Li, Hefei (CN)

(73) Assignee: Hefei University of Technology, Hefei (CN)

( * ) Notice: Subject to any disclaimer, the term of this patent is extended or adjusted under 35 U.S.C. 154(b) by 0 days.

(21) Appl. No.: 18/467,158

(22) Filed: Sep. 14, 2023

(30) Foreign Application Priority Data

May 25, 2023 (CN) .......................... 202310593939.2

(51) Int. Cl.
*B23K 20/00* (2006.01)
*B23K 20/12* (2006.01)

(52) U.S. Cl.
CPC ................................ *B23K 20/1255* (2013.01)

(58) Field of Classification Search
CPC ............ B23K 20/1265; B23K 20/1255; B23K 20/125; B23K 20/1245
See application file for complete search history.

(56) References Cited

U.S. PATENT DOCUMENTS

| | | | | |
|---|---|---|---|---|
| 2006/0102699 | A1* | 5/2006 | Burton ................. | B23K 20/124 228/2.1 |
| 2012/0193401 | A1* | 8/2012 | Hori ................... | B23K 20/1265 228/2.1 |
| 2016/0263696 | A1* | 9/2016 | Nishida ................ | B23K 20/16 |
| 2017/0297142 | A1* | 10/2017 | Saito .................... | B23K 20/128 |
| 2017/0297143 | A1* | 10/2017 | Saito .................. | B23K 20/1265 |
| 2018/0071861 | A1* | 3/2018 | Masaki ............. | B23K 20/1245 |
| 2021/0187656 | A1* | 6/2021 | Regensburg ....... | B23K 20/1265 |

(Continued)

FOREIGN PATENT DOCUMENTS

| | | |
|---|---|---|
| CN | 101537538 A | 9/2009 |
| CN | 107931822 A | 4/2018 |
| CN | 211028537 U | 7/2020 |

(Continued)

OTHER PUBLICATIONS

First Office Action issued in counterpart Chinese Patent Application No. 202310593939.2, dated Jun. 28, 2023.

*Primary Examiner* — Erin B Saad

(74) *Attorney, Agent, or Firm* — Westbridge IP LLC

(57) ABSTRACT

A shoulder-angle-adjustable friction stir welding head suitable for a fillet joint includes a stirring head body. A front end of the stirring head body is mounted with a movable shoulder, a stirring pin channel is arranged on the movable shoulder, and the stirring pin channel may allow a stirring pin of the stirring head body to pass through. The present disclosure can respond to welding tasks of the fillet joint of different angles and enlarges an application scope of the friction stir welding head in a manner that the front end of the stirring head body is mounted with the movable shoulder, the stirring pin channel is arranged on the movable shoulder, the stirring pin channel is used for allowing the stirring pin of the stirring head body to pass through, and the angle of the movable shoulder is adjusted.

8 Claims, 15 Drawing Sheets

(56) References Cited

U.S. PATENT DOCUMENTS

2022/0134471 A1\* 5/2022 Okada ................ B23K 20/1245
  228/112.1
2023/0047903 A1\* 2/2023 Price .................. B23K 20/1255

FOREIGN PATENT DOCUMENTS

| CN | 214054211 U | 8/2021 |
| CN | 218136069 U | 12/2022 |
| DE | 102016010076 B3 | 1/2018 |
| JP | 2013123746 A | 6/2013 |
| JP | 2013202630 A | 10/2013 |
| LU | 100238 B1 | 9/2017 |

\* cited by examiner

SHOULDER-ANGLE-ADJUSTABLE FRICTION STIR WELDING HEAD SUITABLE FOR FILLET JOINT

CROSS-REFERENCE TO RELATED APPLICATIONS

The application claims priority to Chinese Patent Application No. 202310593939.2, filed on May 25, 2023, which is incorporated herein by reference in its entirety.

TECHNICAL FIELD

The present disclosure relates to the technical field of friction stir welding, and in particular to a shoulder-angle-adjustable friction stir welding tool suitable for a fillet joint.

BACKGROUND

Friction Stir Welding (FSW) is a solid phase joining technique developed in 1991 by The Welding Institute (TWI). During a welding process, a shoulder and a stirring pin are rotationally inserted into a welded workpiece, a stirring tool rubs against a welded material to generate heat, making the material thermoplastic, and solid phase joining between workpieces is implemented under a mechanical forging action of a stirring tool. This welding way is characterized by excellent welding mechanical property, high welding efficiency, low material consumption and low energy consumption, etc.

At present, the friction stir welding has been more mature in the application of butt joint and lap joint between plates or components. But, when welding a fillet joint, as shown in FIG. 1, the fillet joint is usually converted into a butt joint in order to easily adapt to the rotation and welding of the stirring tool, and through the butt joint, an intersection between two plates is set to a transition section and an end part is cut to an inclined plane for easy splicing and formation. Nevertheless, this way increases the manufacturing and processing cost, while the welding property of the fillet joint that is in butt welding at the back of the plate directly is to be further researched. With the development of the stationary shoulder technique in recent years, the friction stir welding without converting the fillet joint into the butt joint becomes possible. However, the existing stirring tool is only suitable for the fillet joint which welds a constant angle, and cannot weld any weldment with non-standard welding angles. Redesigning a stirring tool is time-consuming and effort-consuming, with a relatively high cost.

SUMMARY

In order to solve the above-mentioned problem, the present disclosure aims at providing a shoulder-angle-adjustable friction stir welding tool suitable for a fillet joint, which can respond to welding tasks of the fillet joint of different angles and enlarges an application scope of the friction stir welding tool in a manner that a front end of a stirring tool body is mounted with a movable shoulder, a stirring pin channel is arranged on the movable shoulder, the stirring pin channel is used for allowing a stirring pin of the stirring tool body to pass through, and an angle of the movable shoulder is adjusted.

To achieve the above-mentioned purpose, the technical solution of the present disclosure is achieved as follows.

A shoulder-angle-adjustable friction stir welding tool suitable for a fillet joint includes a stirring tool body, where a front end of the stirring tool body is mounted with a movable shoulder, a stirring pin channel is arranged on the movable shoulder, and the stirring pin channel may allow a stirring pin of the stirring tool body to pass through.

Further, the movable shoulder includes a first shoulder and a second shoulder, the first shoulder is rotationally connected with the second shoulder, and the stirring pin channel is located at a rotating joint between the first shoulder and the second shoulder.

Further, the shoulder-angle-adjustable friction stir welding tool includes an angle adjusting plate, a first movable linkage and a second movable linkage, where one end of the first movable linkage is rotationally connected with a rear end of the first shoulder while the other end is rotationally connected with one side of the angle adjusting plate; one end of the second movable linkage is rotationally connected with a rear end of the second shoulder while the other end is rotationally connected with the other side of the angle regulating plate; and the angle adjusting plate may move up and down through a fixed plate on the stirring tool body to be limited and sleeved on the stirring tool body.

Further, the shoulder-angle-adjustable friction stir welding tool includes limiting adjustment bolts, where a plurality of adjusting bolt holes are formed in left and right sides of the angle adjusting plate in respective, locating bolt holes that are in corresponding fit with the adjusting bolt holes are formed in the fixed plate, and the angle adjusting plate and the fixed plate are subjected to up-down distance adjustment by the limiting adjustment bolts in fit installation between the adjusting bolt holes and the locating bolt holes.

Further, both the first movable linkage and the second movable linkage include four links and two rotating rods, the four links are arranged in parallel, and both ends of each link are hinged with the rotating rods.

Further, the shoulder-angle-adjustable friction stir welding tool includes a segment, where the stirring pin channel is two semicircle orifices in a middle of a joint of the first shoulder and the second shoulder, a diameter of the segment is equal to the sum of radii of the two semicircle orifices, a cylindrical channel that is slightly greater than a diameter of the stirring pin is arranged inside the segment, the segment is mounted on the stirring pin through the cylindrical channel and located between the two semicircle orifices inside the joint of the first shoulder and the second shoulder, an intersecting line of two tangent planes of the segment is consistent with that of lower-side planes of the first shoulder and the second shoulder, and the tangent planes on both sides of the segment are provided with a gasket slot, which is used for locating and mounting a spherical crown gasket.

Further, the spherical crown gasket includes a contact gasket and an internal gasket, a raised trapezoid small block that is in corresponding fit with the gasket slot is arranged inside the internal gasket while a trapezoid groove that is in corresponding fit with the trapezoid small block is arranged outside the internal gasket, and a trapezoid block that is in corresponding fit with the trapezoid groove is arranged inside the contact gasket while an external side of the contact gasket is smooth.

Further, locating, matching and mounting are performed all between the gasket slot and the trapezoid small block, between the trapezoid groove and the trapezoid small block as well as between the trapezoid groove and the trapezoid block through a rectangular small block and a rectangular hole which mutually correspond and are matched.

Further, a slide along a welding forward direction is arranged outside the movable shoulder.

Further, a rear end of the stirring tool body is provided with a flange plate, the stirring tool body is connected with the fixed plate of a motor through a mounting hole of the flange plate, a rear end of the stirring pin is provided with a clamping handle, and the stirring pin is connected with a rotating shaft of the motor through the clamping handle.

Beneficial effects: the shoulder-angle-adjustable friction stir welding tool provided by the present disclosure can respond to the welding tasks of the fillet joint of different angles and enlarges the application scope of the friction stir welding tool in a manner that the front end of the stirring tool body is mounted with the movable shoulder, the stirring pin channel is arranged on the movable shoulder, the stirring pin channel is used for allowing the stirring pin of the stirring tool body to pass through, and the angle of the movable shoulder is adjusted.

BRIEF DESCRIPTION OF THE DRAWINGS

The drawings, which constitute a part of the present disclosure, are used to provide a further understanding of the present disclosure, and the exemplary embodiments of the present disclosure and the description thereof are used to explain the present disclosure, but do not constitute improper limitations to the present disclosure.

DETAILED DESCRIPTION OF THE EMBODIMENTS

It is to be noted that embodiments in the present disclosure and features in the embodiments may be combined with each other without conflict.

The present disclosure will be described below in detail with reference to drawings and in combination with the embodiments.

Figure 1:
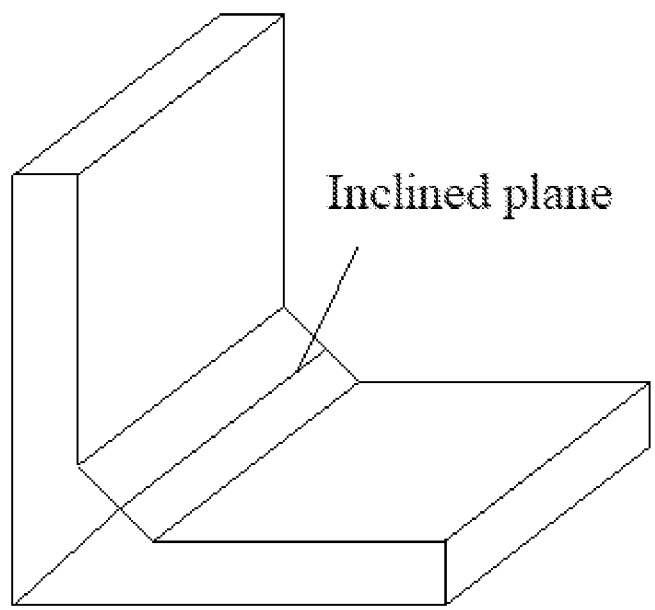
FIG. 1 is a diagram of a fillet joint converted into a butt joint in the background art of the present disclosure.
Figure 2:
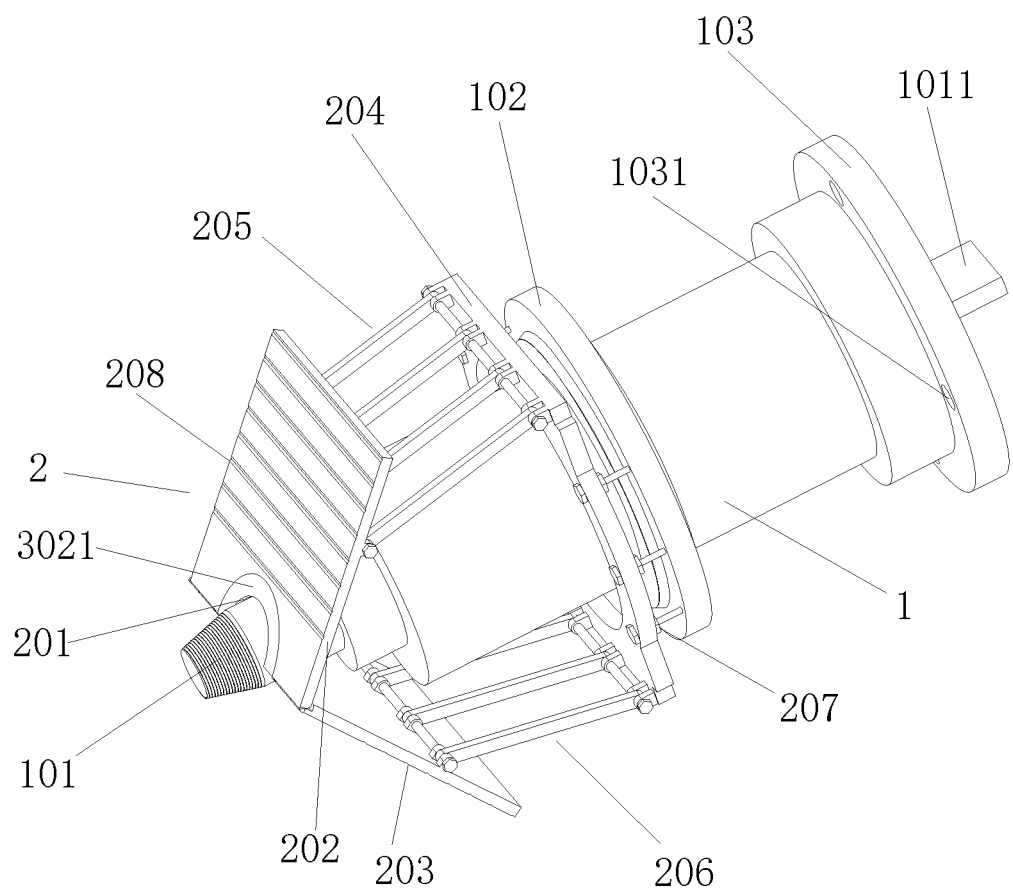
FIG. 2 is a diagram of an overall structure of a shoulder-angle-adjustable friction stir welding tool suitable for a fillet joint in embodiments of the present disclosure.
Figure 3:
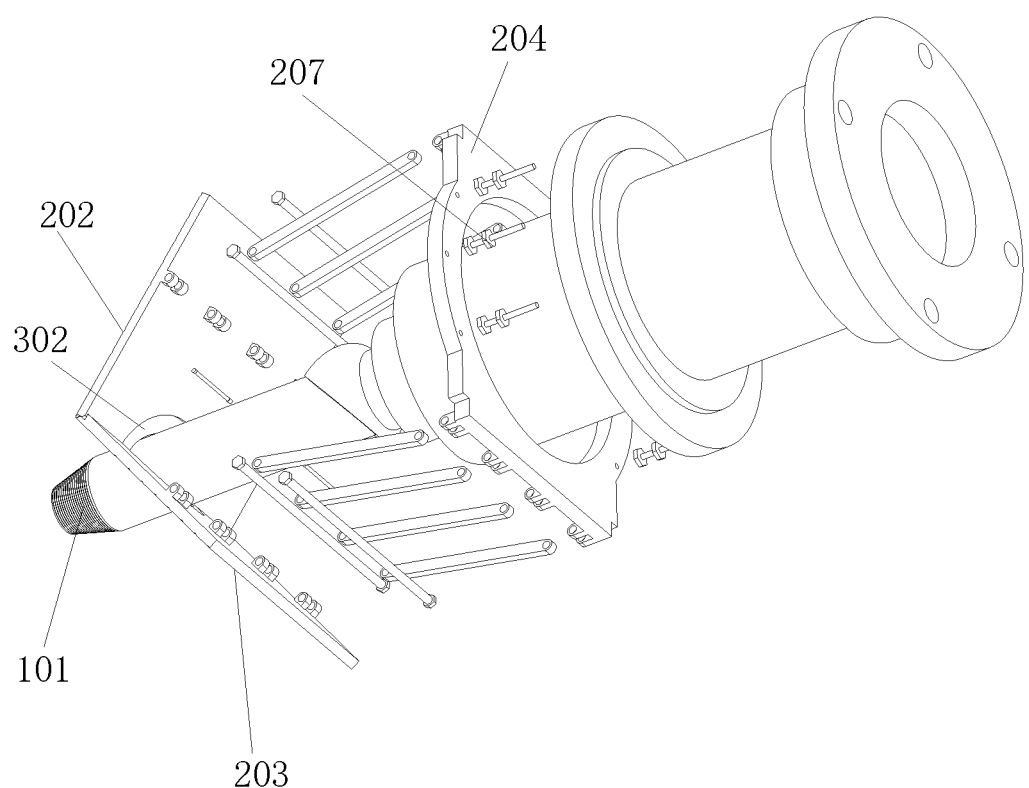
FIG. 3 is an exploded view of a shoulder-angle-adjustable friction stir welding tool suitable for a fillet joint in embodiments of the present disclosure.
Figure 4:
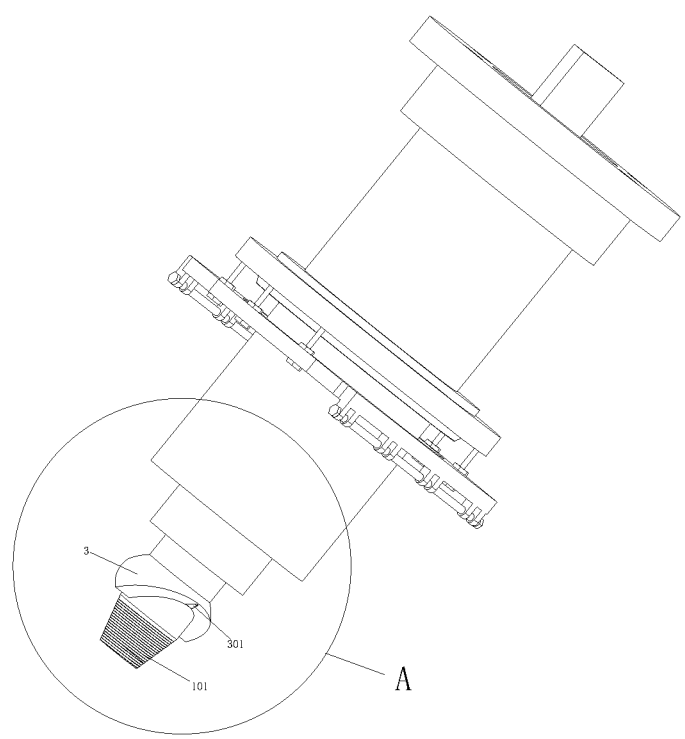
FIG. 4 is a diagram of a partial side structure of a shoulder-angle-adjustable friction stir welding tool suitable for a fillet joint in embodiments of the present disclosure.
Figure 5:
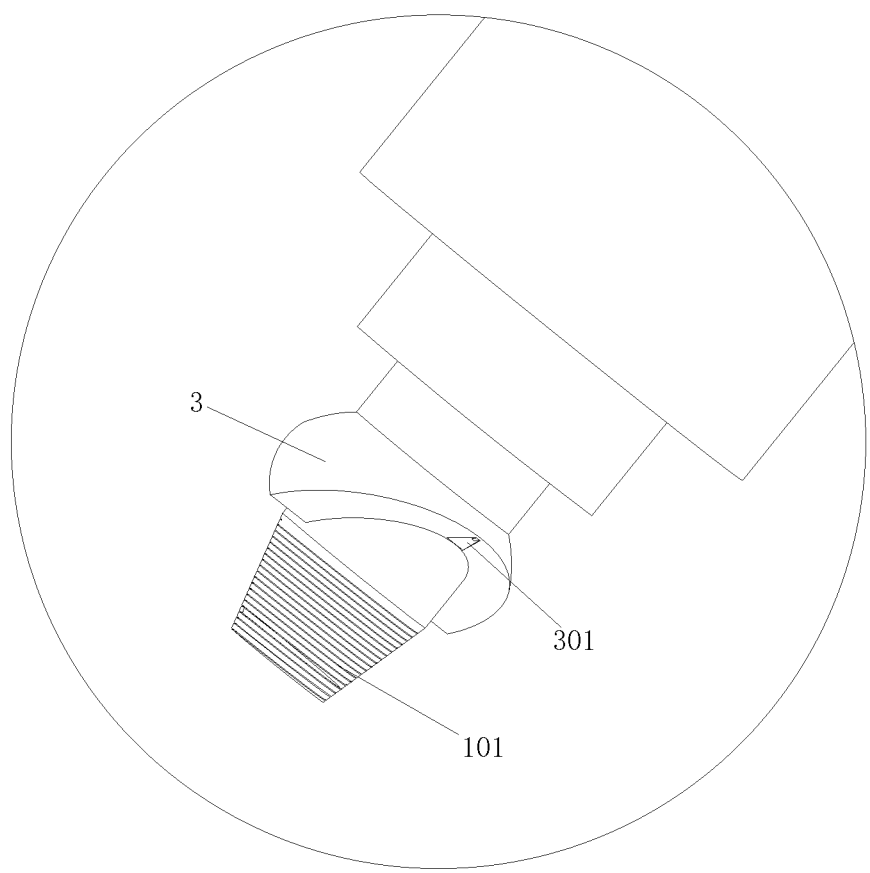
FIG. 5 is an enlarged view of a part A in FIG. 4.
Figure 6:
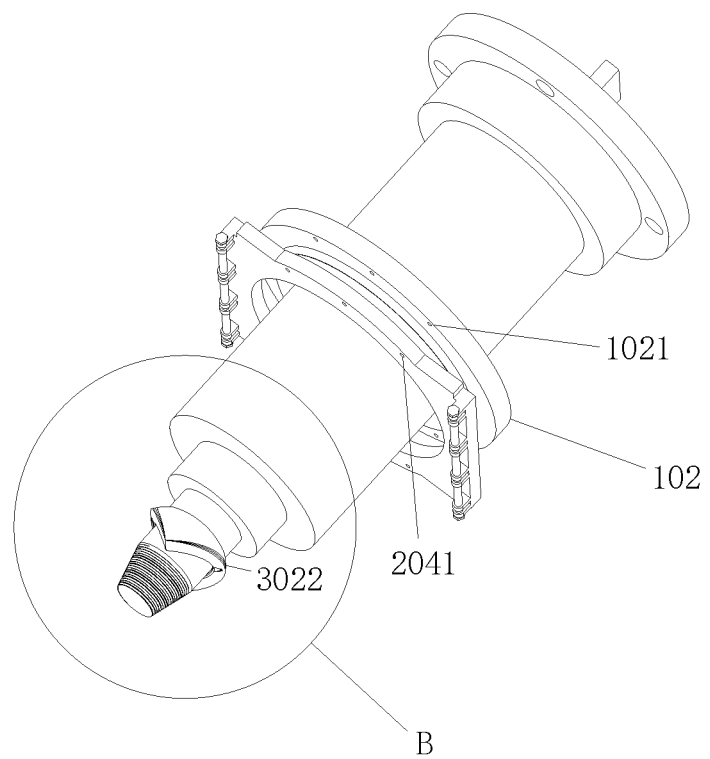
FIG. 6 is a structural diagram of an inclined structure of a shoulder-angle-adjustable friction stir welding tool suitable for a fillet joint in embodiments of the present disclosure.
Figure 7:
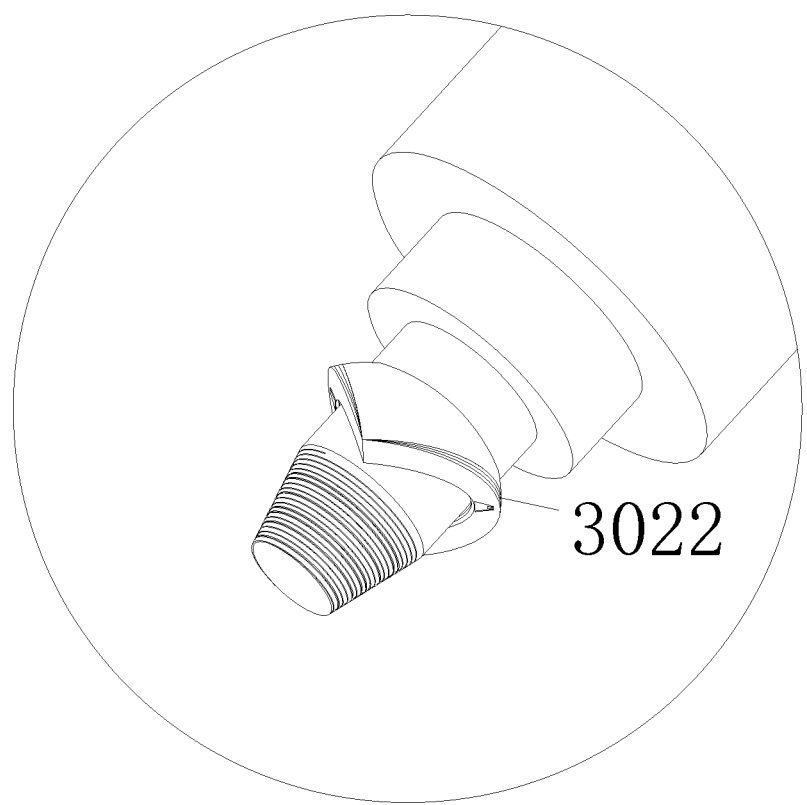
FIG. 7 is an enlarged view of a part B in FIG. 6.
Figure 8:
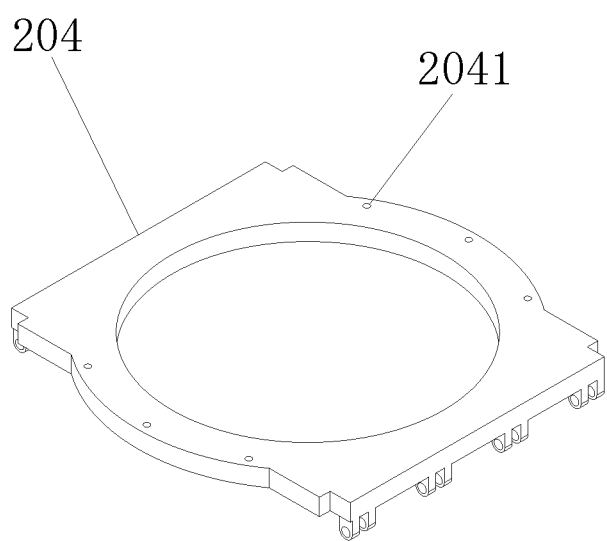
FIG. 8 is a diagram of an angle adjusting plate of a shoulder-angle-adjustable friction stir welding tool suitable for a fillet joint in embodiments of the present disclosure.
Figure 9:
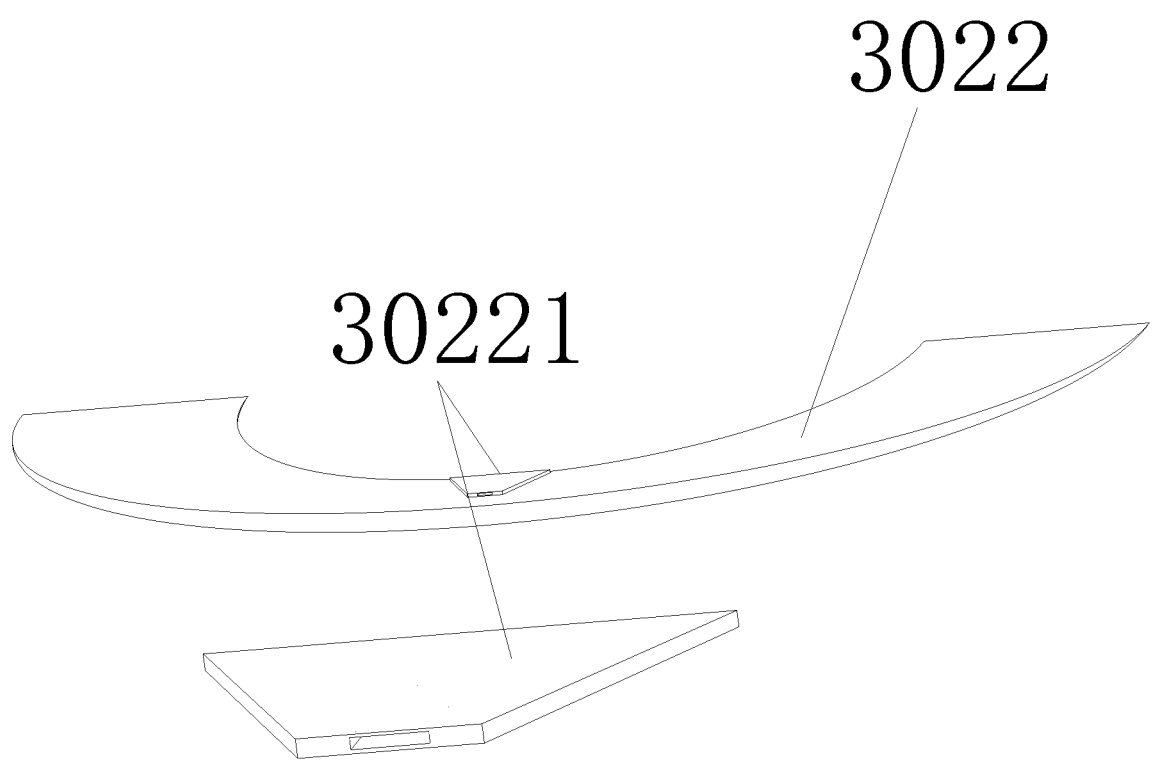
FIG. 9 is a structural diagram inside an internal gasket of a shoulder-angle-adjustable friction stir welding tool suitable for a fillet joint in embodiments of the present disclosure.
Figure 10:
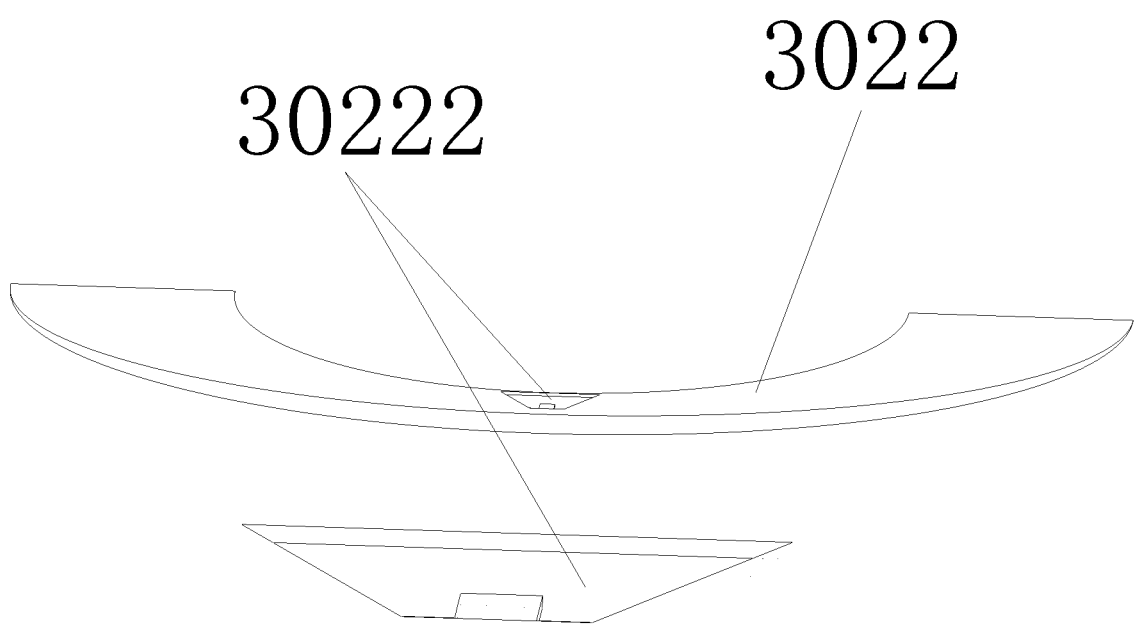
FIG. 10 is a structural diagram outside an internal gasket of a shoulder-angle-adjustable friction stir welding tool suitable for a fillet joint in embodiments of the present disclosure.
Figure 11:
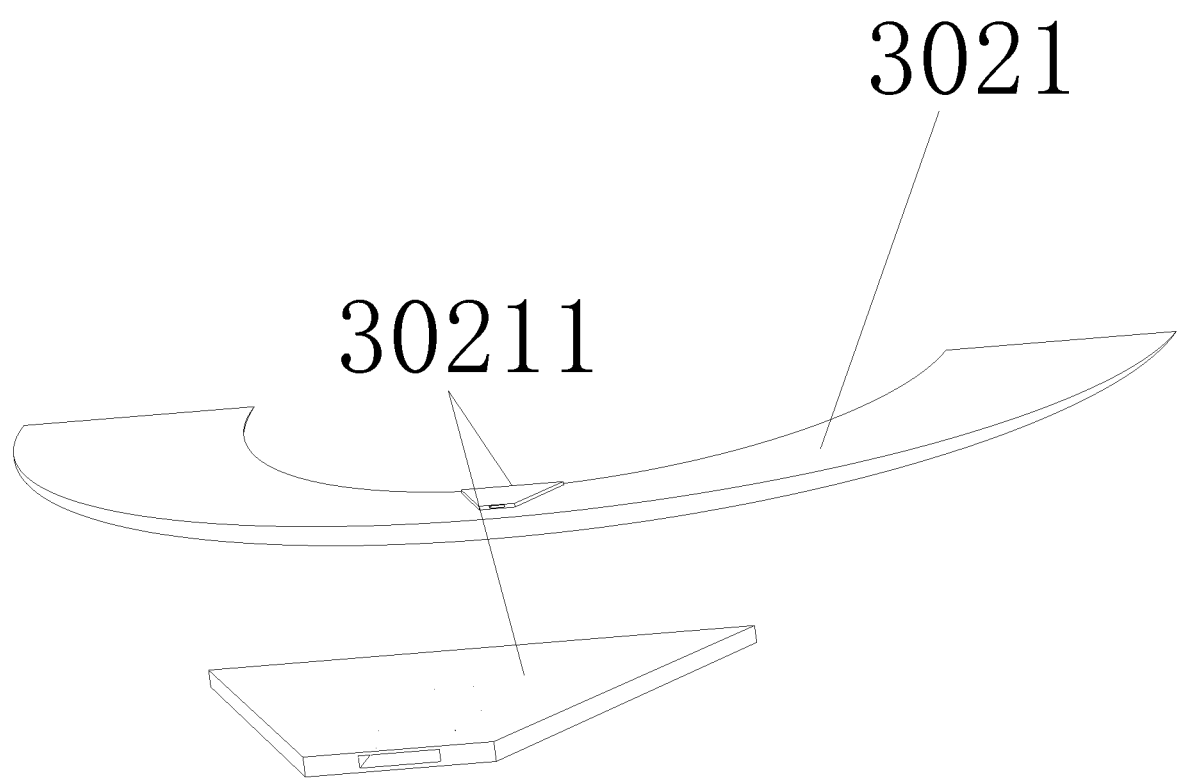
FIG. 11 is a structural diagram inside a contact gasket of a shoulder-angle-adjustable friction stir welding tool suitable for a fillet joint in embodiments of the present disclosure.
Figure 12:
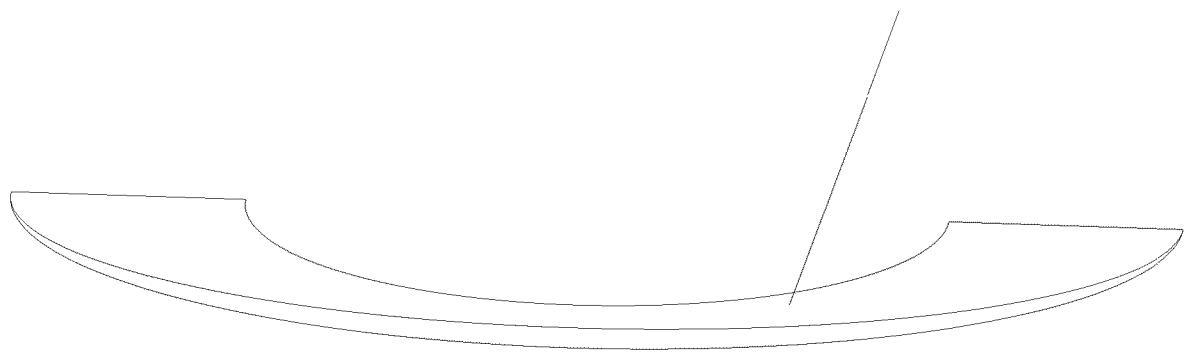
FIG. 12 is a structural diagram outside a contact gasket of a shoulder-angle-adjustable friction stir welding tool suitable for a fillet joint in embodiments of the present disclosure.
Figure 13:
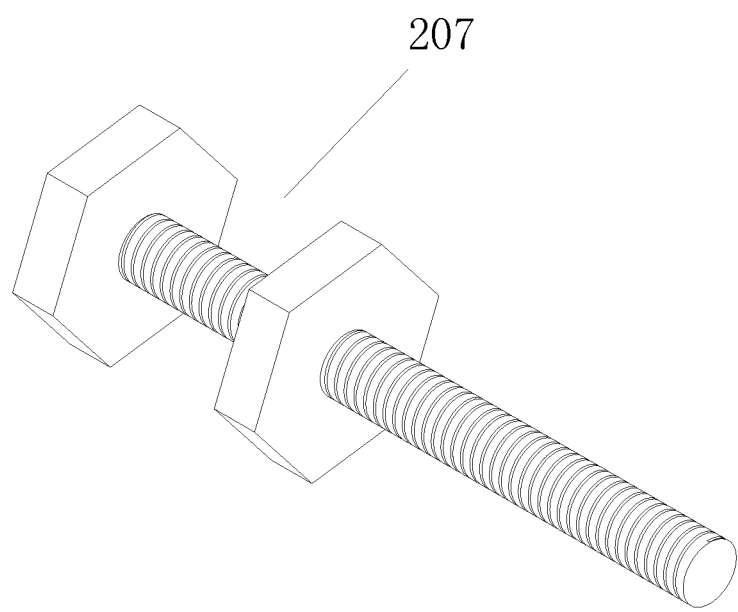
FIG. 13 is a structural diagram of a limiting adjustment bolt of a shoulder-angle-adjustable friction stir welding tool suitable for a fillet joint in embodiments of the present disclosure.
Figure 14:
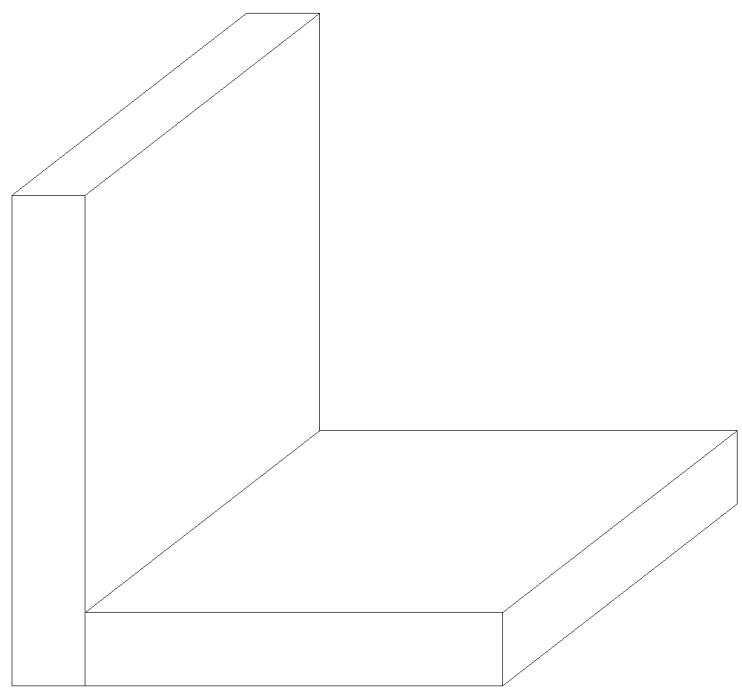
FIG. 14 is a diagram of a fillet joint welded by a shoulder-angle-adjustable friction stir welding tool suitable for a fillet joint in embodiments of the present disclosure.
Figure 15:
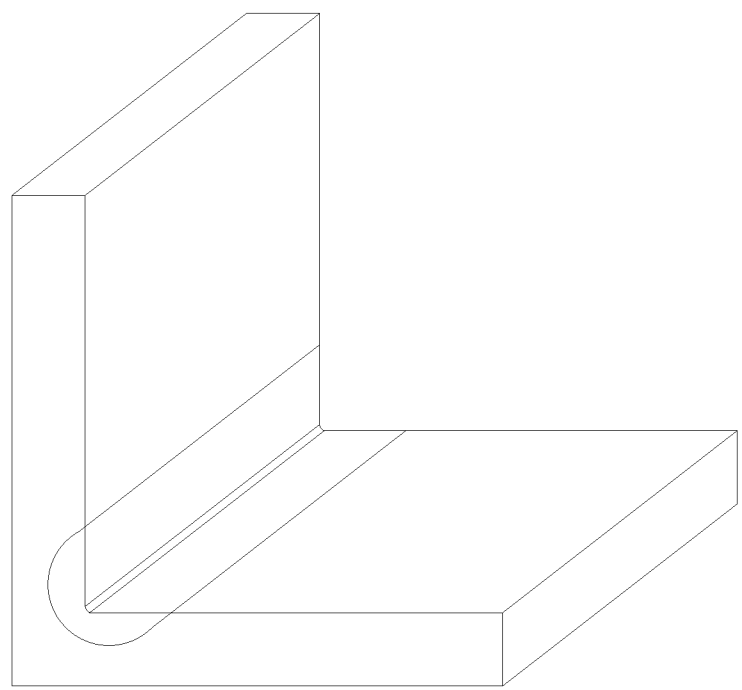
FIG. 15 is a diagram of a fillet joint after welded by a shoulder-angle-adjustable friction stir welding tool suitable for a fillet joint in embodiments of the present disclosure.

Referring to FIG. 2 to FIG. 15, a shoulder-angle-adjustable friction stir welding tool suitable for a fillet join, includes a stirring tool body 1, where a front end of the stirring tool body 1 is mounted with a movable shoulder 2, a stirring pin channel 201 is arranged on the movable shoulder 2, and the stirring pin channel 201 may allow a stirring pin 101 of the stirring tool body 1 to pass through.

This embodiment can respond to the welding tasks of the fillet joint of different angles and enlarges the application scope of the friction stir welding tool by adjusting the angle of the movable shoulder.

It is to be noted that the stationary shoulder of the traditional fillet friction stir welding can only meet the welding task at the specific angle, the shoulder of different angles needs to be customized for the fillet joint of different angles, so the welding cost increases. If the shoulder cannot fit with the weldment, a shape change and other issues of the joint will be caused. The movable shoulder in this embodiment may achieve the complete fit between the shoulder of the fillet joint of different angles and a plate body of an angle joint, with a strong adaptability and a good welding effect.

In one specific embodiment, the movable shoulder 2 includes a first shoulder 202 and a second shoulder 203, the first shoulder 202 is rotationally connected with the second shoulder 203, and the stirring pin channel 201 is located at a rotating joint between the first shoulder 202 and the second shoulder 203.

The movable shoulder in this embodiment may be implemented by the rotationally connected first shoulder and second shoulder, with a simple structure.

In a specific implementation, the first shoulder and the second shoulder in this embodiment implement a hinge-type rotating connection through a pin.

In one specific embodiment, further including an angle adjusting plate 204, a first movable linkage 205 and a second movable linkage 206, where one end of the first movable linkage 205 is rotationally connected with a rear end of the first shoulder 202 while the other end is rotationally connected with one side of the angle adjusting plate 204; one end of the second movable linkage 206 is rotationally connected with a rear end of the second shoulder 203 while the other end is rotationally connected with the other side of the angle regulating plate 204; and the angle adjusting plate 204 may move up and down through a fixed plate 102 on the stirring tool body 1 to be limited and sleeved on the stirring tool body 1.

When the angle adjusting plate in this embodiment moves up and down along the stirring tool body through the fixed plate, the first shoulder and the second shoulder may be driven to unfold or fold correspondingly through the first movable linkage and the second movable linkage, thereby changing the angle between the movable shoulders and conveniently adapting to the fillet joint of different angles.

In one specific embodiment, further including limiting adjustment bolts 207, where a plurality of adjusting bolt holes 2041 are formed in left and right sides of the angle adjusting plate 204 in respective, locating bolt holes 1021 that are in corresponding fit with the adjusting bolt holes 2041 are formed in the fixed plate 102, and the angle adjusting plate 204 and the fixed plate 102 are subjected to up-down distance adjustment by the limiting adjustment bolts 207 in fit installation between the adjusting bolt holes 2041 and the locating bolt holes 1021.

It is to be noted that the limiting adjustment bolts in this embodiment have longer thread lengths, the distance adjustment is achieved by different lengths of thread parts screwed into the locating bolt holes, and after adjustment, clamping, limiting and fixing are performed through intermediate nuts, thereby achieving that the angle adjusting plate moves up and down and is limited and sleeved on the stirring tool body.

In one specific embodiment, both the first movable linkage 205 and the second movable linkage 206 include four links and two rotating rods, the four links are arranged in parallel, and both ends of each link are hinged with the rotating rods.

The first movable linkage and the second movable linkage in this embodiment are of the same structure, both implement the first shoulder and the second shoulder to turn over on both sides of the angle adjusting plate through the four links and the two corresponding rotating rods, thereby implementing the angle adjustment of the shoulder.

In one specific embodiment, further including a segment 3, where the stirring pin channel 201 is two semicircle orifices in a middle of a joint of the first shoulder 202 and the second shoulder 203, a diameter of the segment 3 is equal to the sum of radii of the two semicircle orifices, a cylindrical channel that is slightly greater than a diameter of the stirring pin 101 is arranged inside the segment 3, the segment 3 is mounted on the stirring pin 101 through the cylindrical channel and located between the two semicircle orifices inside the joint of the first shoulder 202 and the second shoulder 203, an intersecting line of two tangent planes of the segment 3 is consistent with that of lower-side planes of the first shoulder 202 and the second shoulder 203, and the tangent planes on both sides of the segment 3 are provided with a gasket slot 301, which is used for locating and mounting a spherical crown gasket 302.

It is to be noted that a gap between the two semicircle orifices is constantly changing when the movable shoulder in this embodiment is subjected to angle adjustment. Hence, for easier fit with the stirring pin channel, the gap between the stirring pin and the stirring pin channel can be perfectly fitted in this embodiment in a manner that the segment, with the intersecting line of the two tangent planes of the segment being consistent with that of the lower-side planes of the first shoulder and the second shoulder, is in fit installation with the spherical crown gasket, thereby reducing the loss of a plasticized metal and the heat loss, and improving the welding quality of the friction welding during the welding process.

In this embodiment, the segment and the gasket stretch into the stirring pin channel of the shoulder, so the misplaced rotation of the movable shoulder may be limited during the welding process. After the installation is completed, the gasket is finally flush with an outer surface of the movable shoulder and in contact with the weldment. A plasticized material is pressed between the gasket and the weldment to be rolled and form a seam, that is smooth and has an appearance consistent with an original shape of the weldment.

In one specific embodiment, the spherical crown gasket 302 includes a contact gasket 3021 and an internal gasket 3022, where a raised trapezoid small block 30221 that is in corresponding fit with the gasket slot 301 is arranged inside the internal gasket 3022 while a trapezoid groove 30222 that is in corresponding fit with the trapezoid small block 30221 is arranged outside the internal gasket 3022, and a trapezoid block 30211 that is in corresponding fit with the trapezoid groove 30222 is arranged inside the contact gasket 3021 while an external side of the contact gasket 3021 is smooth. Locating, matching and mounting are performed all between the gasket slot 301 and the trapezoid small block 30221, between the trapezoid groove 30222 and the trapezoid small block 30221 as well as between the trapezoid groove 30222 and the trapezoid block 30221 through a rectangular small block and a rectangular hole which mutually correspond and are matched.

It is to be noted that the spherical crown gasket in this embodiment has two groups, which are the contact gasket and the internal gasket and both are spherical crown shape. When processing on the tangent planes, the outside of the contact gasket is smooth, the contact gasket is mounted on the outermost side of the gasket group. After the installation is completed, an outside plane is flushed with that of the movable shoulder and in contact with the weldment together with the movable shoulder during welding; and an inside plane is provided with the raised trapezoid small block, the rectangular hole is formed in one side of the trapezoid small block and connected with the outside of the internal gasket or the gasket slot. The inside of the internal gasket is the same as that of the contact gasket and connected with the outside of other internal gaskets or the gasket slot, the trapezoid groove is arranged outside, and the raised trapezoid small block is arranged inside the trapezoid groove. The gasket slot and the trapezoid groove have the consistent shape and are provided with the same rectangular small block, which complement for the trapezoid small block and the rectangular hole. The trapezoid small block of the gasket may be buckled into the trapezoid groove from the side, and the rectangular small block stretches into the rectangular hole for temporary fixation. Two symmetrical gaskets are mounted at each time, and a size of each gasket is consistent with that of the tangent plane of the segment. The gasket is provided with the stirring pin channel, which can fill up the gap between the movable shoulder and the stirring pin and reduce the use of other fasteners after the installation is completed, with firm installation and convenient disassembly. The gasket is suitably made of a high-strength, heat-resistant and friction-resistant material.

In one specific embodiment, a slide 208 along a welding forward direction is arranged outside the movable shoulder 2.

The slide in this embodiment may reduce the forward resistance during the welding process of the stirring tool.

In one specific embodiment, a rear end of the stirring tool body 1 is provided with a flange plate 103, the stirring tool body 1 is connected with the fixed plate of a motor through a mounting hole 1031 of the flange plate 103, a rear end of the stirring pin 101 is provided with a clamping handle 1011, and the stirring pin 101 is connected with a rotating shaft of the motor through the clamping handle 1011.

In this embodiment, the connection between the fixed plate of the motor and the rotating shaft of the motor is implemented through the flange plate and the clamping handle, and the motor drives the clamping handle and the stirring needle to rotate, thereby implementing the friction stir welding.

The working steps of the shoulder-angle-adjustable friction stir welding tool suitable for the fillet joint in this embodiment are as follows: firstly, the misplaced pin holes on the first shoulder and the second shoulder are aligned, the pins pass through the hole at the joint of the two movable shoulders to be assembled into a hinge mechanism, making the two movable shoulders rotate relatively to the pins. Movable links are mounted, and the movable shoulders are connected with the angle adjusting plate through the movable links. The movable links are hinged in pairs through the pin and pin bolt. The angle of each movable shoulder is adjusted, the limiting adjustment bolt cooperates with the fixed plate to fix the angle adjusting plate, so as to limit the movement of the angle adjusting plate, then to limit the rotation of the movable shoulders. The gaskets are mounted, the internal gasket is connected with two sides of the segment, the raised trapezoid small block inside the internal gasket slides into the gasket slot from the side, the rectangular small block of the gasket slot stretches into the rectangular hole of the trapezoid small block, the trapezoid small block is buckled in the slot, the constraint in a tangent plane direction of the segment is provided to the gasket by using the groove of the gasket slot, and the constraint in a normal plane direction of the segment is provided to the gasket by using the rectangular small block. The internal gasket is continuously mounted by using the above steps, the contact gasket is mounted on the outermost side, so that the outer surface of the contact gasket is flush with the movable shoulders. The stirring pin passes through a hollow part composed of a housing of the stirring body, the gasket and the shoulder, the clamping handle at the rear end is fixed on the rotating shaft of the motor, and at the same time the housing is fixed on the fixed plate of the motor.

After the installation is completed, the motor is started and drives the rotating shaft of the motor for performing the welding operation.

After the welding is completed, the above operations may be repeated, and the welding task for the fillet joint of different angles is completed by adjusting the shoulder angle and increasing and decreasing the quantity of the gasket.

The above is only optional embodiments of the present disclosure and not intended to limit the present disclosure. Any modifications, equivalent replacements, improvements and the like made within the spirit and principle of the present disclosure shall fall within the protection scope of the present disclosure.

What is claimed is:

1. A shoulder-angle-adjustable friction stir welding tool suitable for a fillet joint, comprising a stirring tool body, wherein a front end of the stirring tool body is mounted with a movable shoulder, a stirring pin channel is arranged on the movable shoulder, and the stirring pin channel allows a stirring pin of the stirring tool body to pass through; the movable shoulder comprises a first shoulder and a second shoulder, the first shoulder is rotationally connected with the second shoulder, and the stirring pin channel is located at a rotating joint between the first shoulder and the second shoulder; and the movable shoulder further comprises an angle adjusting plate, a first movable linkage and a second movable linkage, one end of the first movable linkage is rotationally connected with a rear end of the first shoulder while an other end of the first movable linkage is rotationally connected with one side of the angle adjusting plate, one end of the second movable linkage is rotationally connected with a rear end of the second shoulder while an other end of the second movable linkage is rotationally connected with an other side of the angle adjusting plate, and the angle adjusting plate moves up and down through a fixed plate on the stirring tool body to be limited and sleeved on the stirring tool body.

2. The shoulder-angle-adjustable friction stir welding tool suitable for the fillet joint according to claim 1, further comprising limiting adjustment bolts, wherein a plurality of adjusting bolt holes are formed respectively in left and right sides of the angle adjusting plate, locating bolt holes that are in corresponding fit with the adjusting bolt holes are formed in the fixed plate, and the angle adjusting plate and the fixed plate are subjected to up-down distance adjustment by the limiting adjustment bolts in fit installation between the adjusting bolt holes and the locating bolt holes.

3. The shoulder-angle-adjustable friction stir welding tool suitable for the fillet joint according to claim 1, wherein both the first movable linkage and the second movable linkage comprise four links and two rotating rods, the four links are arranged in parallel, and both ends of each link are hinged with the rotating rods.

4. The shoulder-angle-adjustable friction stir welding tool suitable for the fillet joint according to claim 1, further comprising a segment, wherein the stirring pin channel is two semicircle orifices in a middle of a joint of the first shoulder and the second shoulder, a diameter of the segment is equal to the sum of radii of the two semicircle orifices, a cylindrical channel that is slightly greater than a diameter of the stirring pin is arranged inside the segment, the segment is mounted on the stirring pin through the cylindrical channel and located between the two semicircle orifices inside the joint of the first shoulder and the second shoulder, an intersecting line of two tangent planes of the segment is consistent with that of lower-side planes of the first shoulder and the second shoulder, and the tangent planes on both sides of the segment are provided with a gasket slot, which is used for locating and mounting a spherical crown gasket.

5. The shoulder-angle-adjustable friction stir welding tool suitable for the fillet joint according to claim 4, wherein the spherical crown gasket comprises a contact gasket and an internal gasket, a raised trapezoid small block that is in corresponding fit with the gasket slot is arranged inside the internal gasket while a trapezoid groove that is in corresponding fit with the trapezoid small block is arranged outside the internal gasket, and a trapezoid block that is in corresponding fit with the trapezoid groove is arranged inside the contact gasket while an external side of the contact gasket is smooth.

6. The shoulder-angle-adjustable friction stir welding tool suitable for the fillet joint according to claim 5, wherein locating, matching and mounting are performed all between the gasket slot and the trapezoid small block, between the trapezoid groove and the trapezoid small block as well as between the trapezoid groove and the trapezoid block through a rectangular small block and a rectangular hole which mutually correspond and are matched.

7. The shoulder-angle-adjustable friction stir welding tool suitable for the fillet joint according to claim 1, wherein a slide along a welding forward direction is arranged outside the movable shoulder.

8. The shoulder-angle-adjustable friction stir welding tool suitable for the fillet joint according to claim 1, wherein a rear end of the stirring tool body is provided with a flange plate, the stirring tool body is connected with a fixed plate of a motor through a mounting hole of the flange plate, a rear end of the stirring pin is provided with a clamping handle, and the stirring pin is connected with a rotating shaft of the motor through the clamping handle.

* * * * *

UNITED STATES PATENT AND TRADEMARK OFFICE
CERTIFICATE OF CORRECTION

| | | |
|---|---|---|
| PATENT NO. | : 11,958,127 B1 | Page 1 of 1 |
| APPLICATION NO. | : 18/467158 | |
| DATED | : April 16, 2024 | |
| INVENTOR(S) | : Beibei Li et al. | |

It is certified that error appears in the above-identified patent and that said Letters Patent is hereby corrected as shown below:

On the Title Page

Item [54], Title and in the Specification, Column 1, Lines 1-3 change "SHOULDER-ANGLE-ADJUSTABLE FRICTION STIR WELDING HEAD SUITABLE FOR FILLET JOINT" to --SHOULDER-ANGLE-ADJUSTABLE FRICTION STIR WELDING TOOL SUITABLE FOR FILLET JOINT--.

Item [57], Abstract, all of the word "head" should be changed to --tool--.

Signed and Sealed this
Twenty-third Day of July, 2024

Katherine Kelly Vidal
*Director of the United States Patent and Trademark Office*